United States Patent [19]

Kato

[11] Patent Number: 4,601,008
[45] Date of Patent: Jul. 15, 1986

[54] DATA PROCESSING SYSTEM

[75] Inventor: Motokazu Kato, Sagamihara, Japan

[73] Assignee: Fujitsu Limited, Kawasaki, Japan

[21] Appl. No.: 509,610

[22] Filed: Jun. 30, 1983

[30] Foreign Application Priority Data

Jun. 30, 1982 [JP] Japan .............................. 57-113317

[51] Int. Cl.⁴ .......................................... G06F 11/34
[52] U.S. Cl. .................................................. 364/900
[58] Field of Search ... 364/200 MS File, 900 MS File, 364/550, 551, 300 MS File; 371/19, 16, 18, 62

[56] References Cited

U.S. PATENT DOCUMENTS

| | | | |
|---|---|---|---|
| 3,688,263 | 8/1972 | Balogh | 371/16 |
| 4,205,370 | 5/1980 | Hirtle | 364/200 |
| 4,231,106 | 10/1980 | Heap | 364/900 |
| 4,355,389 | 10/1982 | Sato | 371/18 |

OTHER PUBLICATIONS

H. W. Flanagan, "Program Monitoring Technique", IBM Technical Disclosure Bulletin, vol. 13, No. 8, Jan. 1971.

Primary Examiner—James D. Thomas
Assistant Examiner—Florin Munteanu
Attorney, Agent, or Firm—Staas & Halsey

[57] ABSTRACT

A data processing system having a performance measurement system which is capable of setting desired performance measurement items. In the performance measuring system an interrupt by internal timer is used for triggering performance measurement, the performance measurement system executes the processings after this timer interrupt, and processing results for each measurement item are collected in the main storage.

15 Claims, 13 Drawing Figures

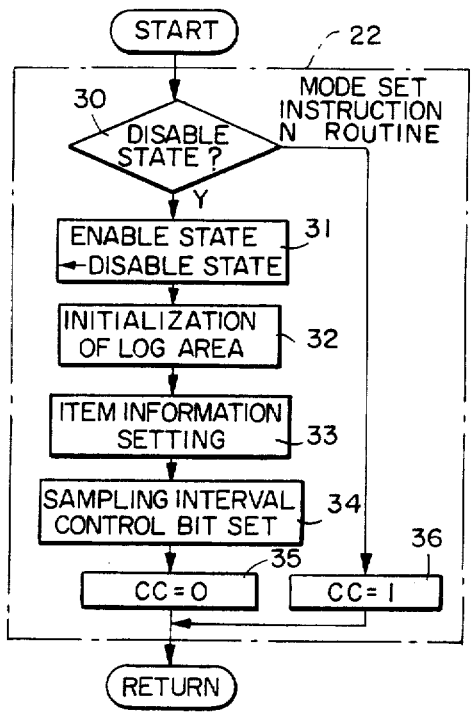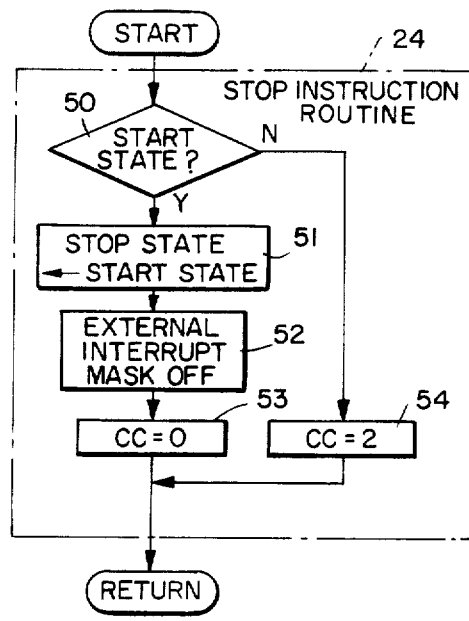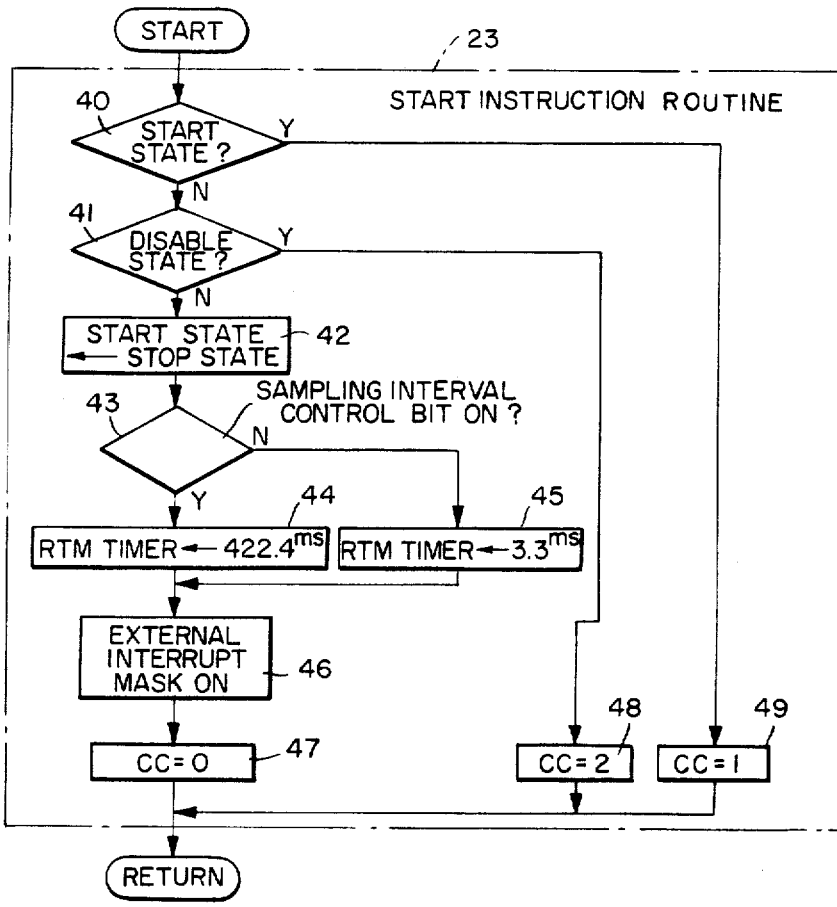

DATA PROCESSING SYSTEM

BACKGROUND OF THE INVENTION

1. Field of the Invention

This invention relates to a data processing system including a performance measurement system and more specifically to a data processing system capable of measuring performance using a timer provided therein.

2. Description of the Prior Art

Performance measurement of a data processing system which executes instructions in main storage by fetching the instructions can provide an important guideline for development of a more advanced system in the next development phase, for example and for design of software.

FIG. 1 is an example of an existing system. An existing performance measurement of a data processing system is performed, for example, by the logic circuit hardware as shown in FIG. 1. A processing system 1 is provided, for example, with the counter circuits 4-1 to 4-n for each performance measurement item such as an instruction appearance frequency etc. and a selection circuit 3 selects a point for performance measurement through the control of control circuit 2 and thereby each counter circuit 4-1 to 4-n is operated by trigger signals determined for respective measuring items. According to such a prior art system, a large amount of hardware provided only for performance measurement is necessary, the performance measurement items are fixed and performance measurement for other items than those stored in the computer system cannot be measured. However, if performance measurement is carried out by software operating under a normal operating system, such a program for performance measurement realized by the software can be designed not to have any adverse effect on the result of a performance measurement.

SUMMARY OF THE INVENTION

It is an object of the present invention to provide a performance measurement system which has eliminated the above-discussed problems and has flexibility so that desired performance measurement items can be determined without using hardware which fixes the performance measurement items.

Therefore, it the present invention, in order to attain this object, control is transferred to the performance measurement system utilizing an external interruption by timer based on loading a value in the timer within the processing system for triggering the performance measurement, and the result of processing for each measurement item obtained by such performance measurement are collected, for example, and stored in main storage.

A data processing system according to the present invention includes: measurement information storing means into which measurement information is stored corresponding to the performance measurement items, measurement control information storing means into which the performance measurement item information and performance measurement condition information are stored, a timer, a measurement control information or parameter setting processing system for controlling information setting into said measurement control information storing means, and a performance measurement processing system which is started by a sampling instruction interruption by from said timer and collects measurement information for said measurement information storing means based on said performance measurement item information and performance measurement condition information.

BRIEF DESCRIPTION OF THE DRAWINGS

FIG. 5 through FIG. 9 are flowcharts of processing by the performance measurement settng system.

DESCRIPTION OF THE PREFERRED EMBODIMENTS

Figure 1:
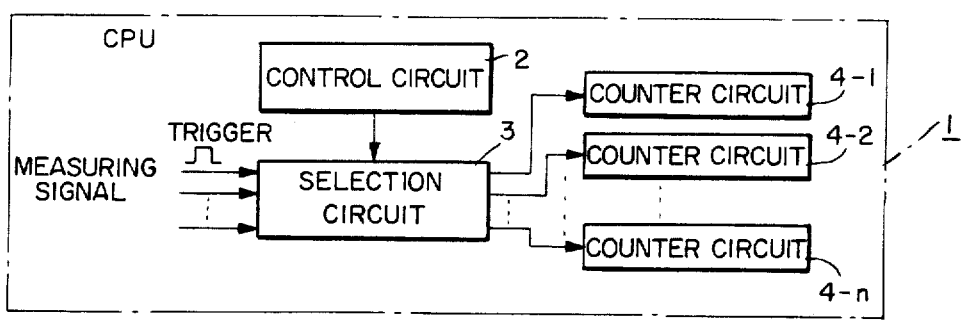
FIG. 1 is a system of the prior art as described above.
Figure 2:
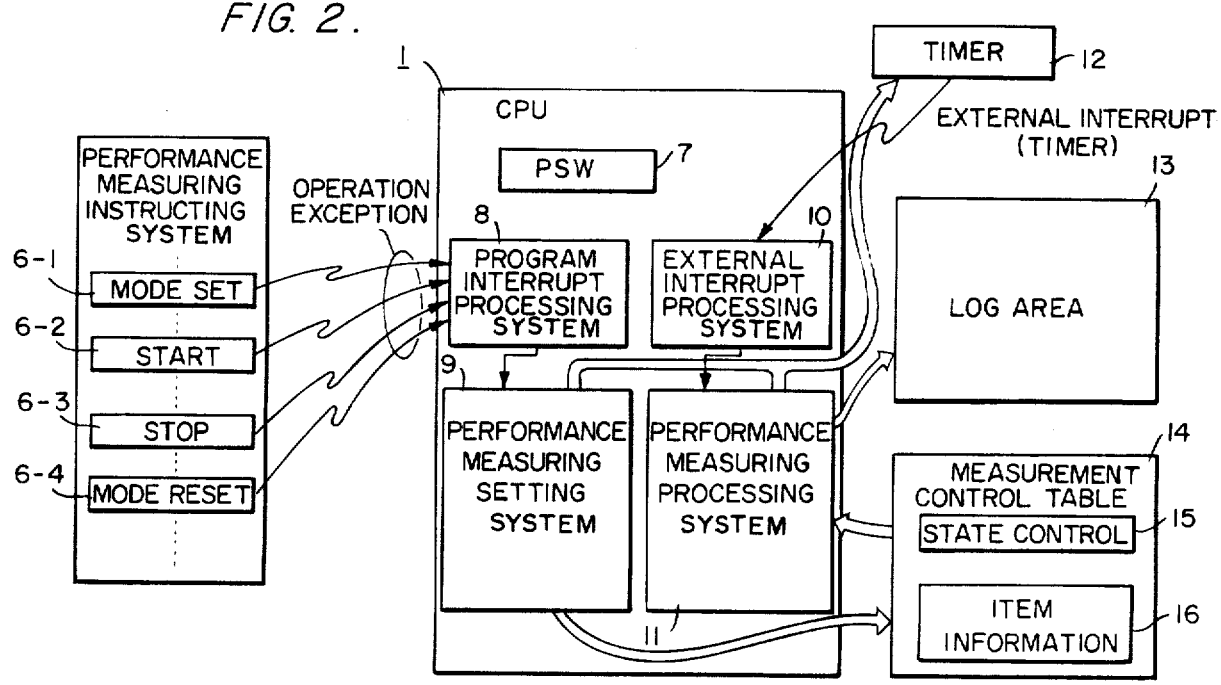
FIG. 2 is a diagram of the conceptual structure of an embodiment of the present invention.

In an embodiment of the present invention illustrated in FIG. 2, 1 is a processing system, 5 is a performance measurement instructing system, 6-1–6-4 are performance measurement setting instructions and, in particular, 6-1 is a mode set instruction, 6-2 is a start instruction, 6-3 is a stop instruction, 6-4 is a mode reset instruction. 7 is a program status word (PSW), 8 is an external interrupt processing system, 9 is a performance measurement setting system, 10 is an external interrupt processing system, 11 is a performance measurement processing system, 12 is a timer, 13 is a log area, 14 is a measurement control table, 15 is a state control information setting area, 16 is an item information setting area.

The processing system 1 executes instructions from the main storage by fetching them and thereby performs data processing. The performance measurement instructing system 5 comprises machine word instruction groups that carry out performance measurement of processing system 1, and particularly operate the firmware, to be described later, by issuing the performance measurement setting instructins 6-1 to 6-4 provided in the present invention. As the performance measurement setting instructions there are included, for example, the mode set instruction 6-1 for enabling the performance measurement items by selecting them, start instruction 6-2 for starting a performance measurement, stop instruction 6-3 for ending of performance measurement, and mode reset instruction 6-4 releasing the setting or disabling of selected performance measurement items. Generally, machine word instruction comprises an instruction code indicating the kind of instruction and an operand indicating an object of the operation, but an undefined instruction codes are assigned as the above performance measurement setting instructions 6-1–6-4. Therefore, when these instructions 6-1–6-4 are executed by the processing system 1, a program interrupt is generated by an operation exception that results due to the detection of the invalid instruction (that is, the undefined instruction code).

The program interrupt processing system 8 executes processing corresponding to various types of program interruptions, through these processings when a program interrupt is generated by various exceptional conditions detected during execution of the instructions, control is transferred after saving of the contents of PSW 7. If program interrupt occurs due to execution of performance measurement setting instructions 6-1–6-4, the performance measurement setting system 9 comprising the firmware (a program or microprogram stored in a read only type portion of main memory) is started.

The performance measurement setting system 9 sets the control information designated by the mode set instruction 6-1 into the measurement control table 14 and controls start of a measurement by setting a control bit for the timer 12 and the timing loading portion of the start instruction 6-2. Details of this processing are described later. The timer 12 operates in the same way as an ordinary CPU timer and when the time loaded into the timer 12 has passed, an external interrupt is generated. A new timer can be provided specifically for performance measurement but an existing timer, such as dispatch timer, for example, used for dispatch in a virtual computer system may also be used. In this embodiment, a dispatch timer is used.

When an external interrupt is generated by the timer 12, an external interrupt processing system 10 is started. The external interrupt processing system 10 starts the performance measurement processing system 11 based on the interrupt code when such interrupt is caused by the timer 12. The performance measurement processing system 11 comprises firmware and as described later, collects the performance measurement information and stores it in the log area 13. An external interrupt due to the timer 12 is generated after which can be freely a period designated by the mode set instruction 6-1 and therefore the performance measurement processing system 11 performs random sampling of measurement data with an external interrupt considered as a trigger.

Figure 3:
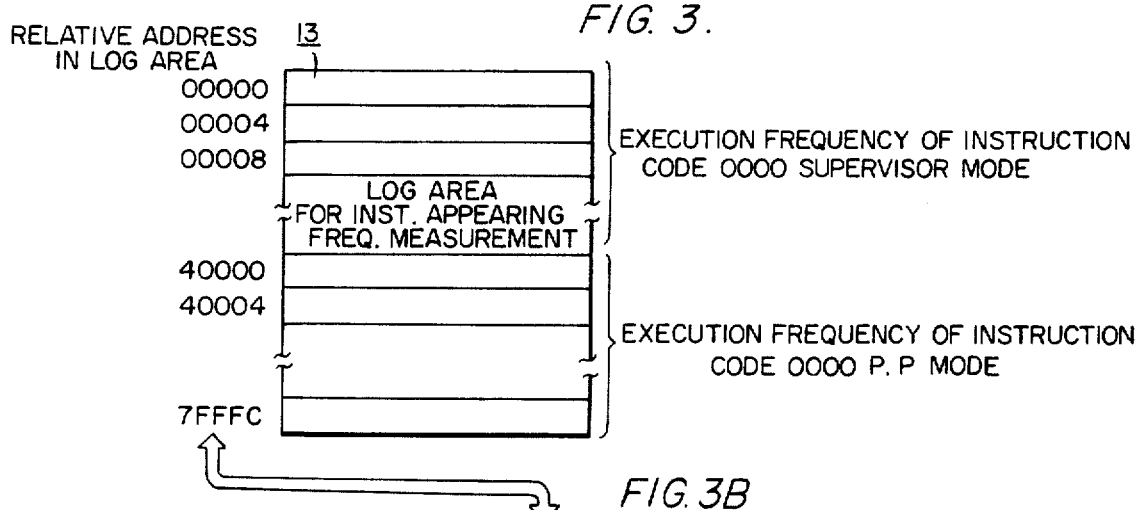
FIG. 3 including 3A and 3B, is an example of log area in the present invention.
Figure 3B:
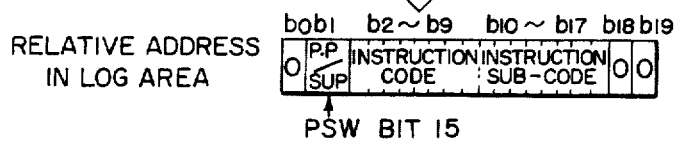

As a performance measurement item, there is, for example, an appearance frequency measurement for each instruction. The log area 13 for the instruction appearance frequency measurement is for example constructed as shown in FIG. 3 and is reserved within the main storage. Two areas of 4 bytes each are reserved for each instruction code, one area for the supervisor (SVP) mode of the processing system 1 and the other area for a problem program (PP) mode, and a relative address in the log area 13 (that is, the supervisor mode storage area or the problem program storage area and the location within the storage area) is determined, as shown in the FIG. 3B, by the combination of the state mode obtained from the 15th bit of the PSW 7 and the instruction code from bits 10-17 containing the instruction sub-code. Therefore, the performance measurement processing system 11 is capable of counting up the directly checked instruction appearance frequency.

Figure 4:
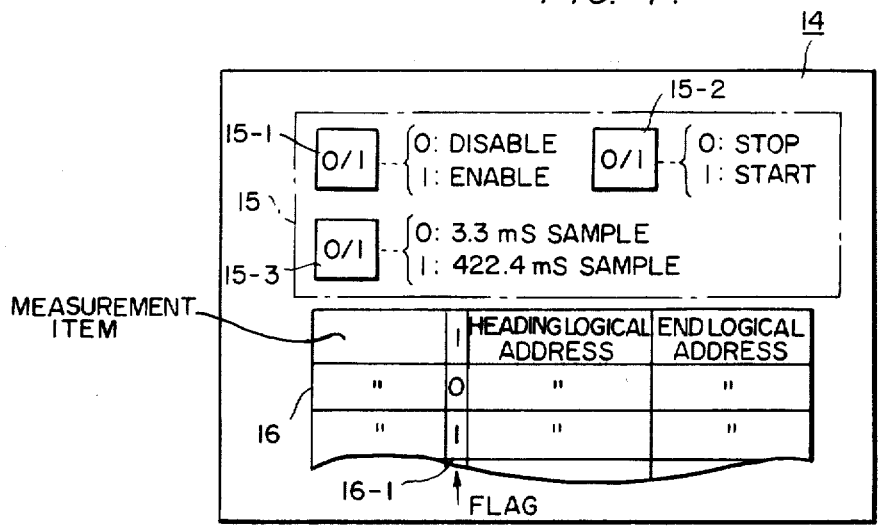
FIG. 4 is an example of a measurement control table.
Figure 5:
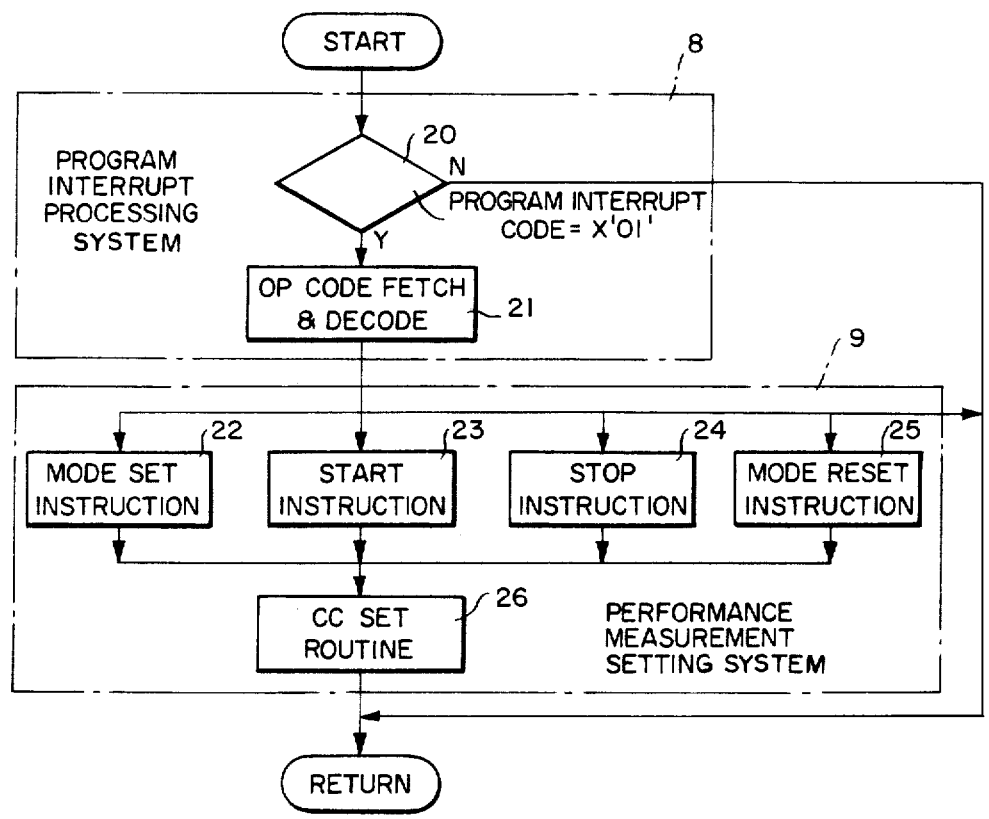

The measurement control table 14 is for example structured as shown in FIG. 4. In the state control information setting domain or region 15 of the measurement control table 14, there exists a mode state flag 15-1 which is set to "1" by the mode set instruction 6-1 or to "0" by the mode reset instruction 6-4 and a start/stop state flag 15-2 which is set to "1" by the start instruction 6-2 or to "0" by the stop instruction 6-3. In addition, a sampling interval control bit 15-3 is also provided. In this embodiment, a sampling period of 3.3 ms or 422.4 ms can be selected by the OFF/ON of bit 15-3, and it is naturally possible to freely select more sampling periods by increasing the number of sampling interval control bits. In an item information setting domain 16, for example, a measurement item indicates the name of the items to be measured and heading and end logical addresses indicate the collecting range thereof is set for each item, that is, the range of memory locations over which performance measurement for the item is to be performed.

FLAG 16-1 indicates whether the logical address indicating the collecting range is valid or invalid.

By referring to FIG. 5 through FIG. 9, processing by the performance measurement setting system 9 is described. When a program interrupt is generated, the program interrupt processing system 8 is started and the program interrupt processing system 8 determines first, in accordance with processing decision block 20 shown in FIG. 5, whether the program interrupt code is the operation exception (X'01'). When it is not the operation exception, ordinary program interrupt processing is executed. When it is an operation exception, the instruction code which has caused program interrupt is fetched as illustrated by processing block 21 and then analyzed. As a result of the analysis, when the performance measurement setting instruction 6-1 to 6-4 is identified or decoded, the performance measurement setting system 9 is started.

The performance measurement setting system 9 calls, based on the instruction code, the mode set instruction processing system 22, a start instruction processing system 23, a stop instruction processing system 24 and a mode reset instruction processing system 25, executes the processing for instructions 6-1 to 6-4 as described later. Then processing returns to the interrupt generating routine after a condition code (CC) indicating result of the execution is set.

The mode set instruction processing system 22 executes processing as shown in FIG. 6. First, according to decision processing block 30 shown in FIG. 6, a check, by referring to or testing the state flag 15-1 of the measurement control table 14 shown in FIG. 4, of whether current state is an ENABLE or DISABLE state. If the current state is the ENABLE state, CC is set to "1" in processing block 36 and the processing returns to the calling area. If the state is the DISABLE state the state flag 15-1 is turned ON in processing block 31 and thereby the state becomes the ENABLE state. Then, the log area 13 is initialized in processing block 32 and the item information is loaded into the measurement control table 14 from the information designated by the operand of the mode set instruction 6-1 in processing block 33. The sampling interval control bit 15-3 is set to "0" or "1" in processing block 34 and finally CC is set to "0" indicating the normal end in processing block 35 and then processing returns to the calling routine.

The start instruction processing system 23 executes processing as shown in FIG. 7. First, the state flags 15-2 and 15-1 of the measurement control table 14 are checked in processing blocks 40 and 41 as shown in FIG. 7. If the START state is already stated, CC is set to "1" in processing block 49, and when the current state is DISABLE, CC is set to "2" in processing block 48, and the processing returns to the calling routine. If the current state is the STOP state and the ENABLE state, control is transferred to processing block 42, the state flag 15-2 is turned ON and thereby the START state is indicated. Then, if the sampling interval control bit 15-3 is ON as a result of a test thereof, the dispatch timer 12 is loaded with 422.4 ms in processing block 44, or if such bit is OFF, the dispatch timer 12 is loaded with 3.3 ms in processing block 45. This is done with a firmware instruction (SET RVM TIMER). The external interrupt mask for the timer 12 is also turned ON in processing block 46 and the inhibit of an external interrupt is cancelled. Thus, an external interrupt can be generated after time passage of 3.3 ms or 422.4 ms. When the external interrupt mask is turned ON, CC is set to "0" in processing block 47 and processing returns to the calling routine.

The stop instruction processing system 24 executes processing as shown in FIG. 8. First, whether the START state has started is determined in decision processing block 50. If the current state is not the START state, CC is set to "2" in processing block 54 and processing returns to the calling routine. When the current state is the START state, it is changed to the STOP state in processing block 51, and the external interrupt mask for the timer 12 is turnned OFF in processing block 52, thereby inhibiting interrupts therefrom, and sampling is suspended. Then CC is set to "0" in processing block 53 and thereafter the processing returns to the calling routine.

Figure 9:
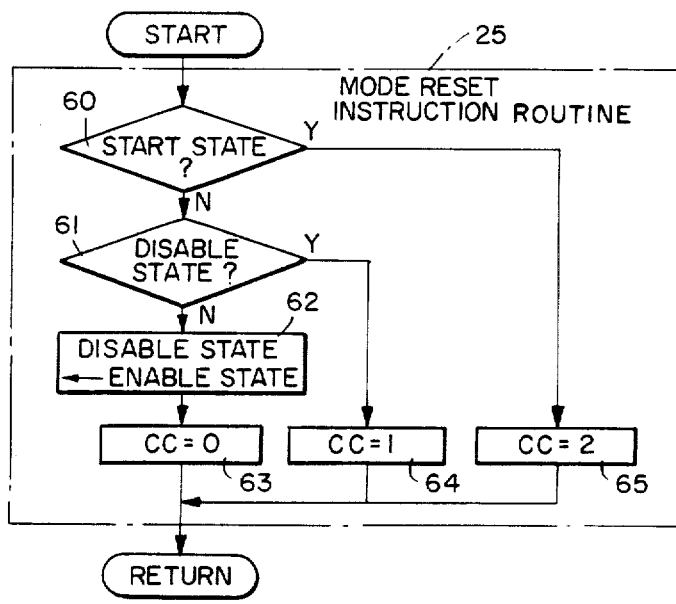

The mode reset instruction processing system 25 executes the processing as indicated in the FIG. 9 routine. First a check on whether current state is the START state is performed in decision processing block 60. When the START state has started, CC is set to "2" in processing block 65, and processing returns to the calling routine. Then, a check in decision processing block 61 occurs on whether the current state is the DISABLE state. When currrent state is the DISABLE state, CC is set to "1" in processing block 64. When the state is the ENABLE, the state is changed to the DISABLE state and CC is set to "0" in processing block 63. Then, processing returns to the calling routine.

Figure 10:
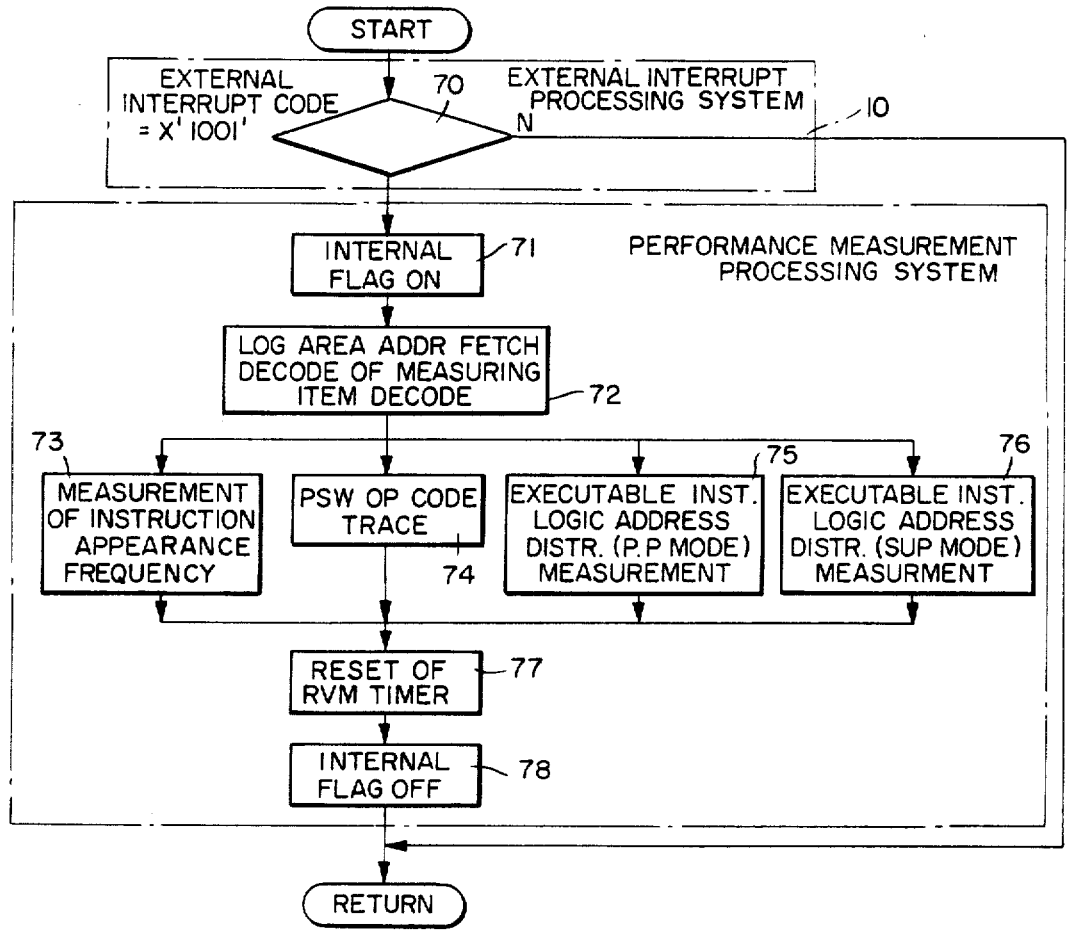
FIG. 10 and FIG. 11 are flowcharts of processing by the performance measurement processing system.
Figure 11:
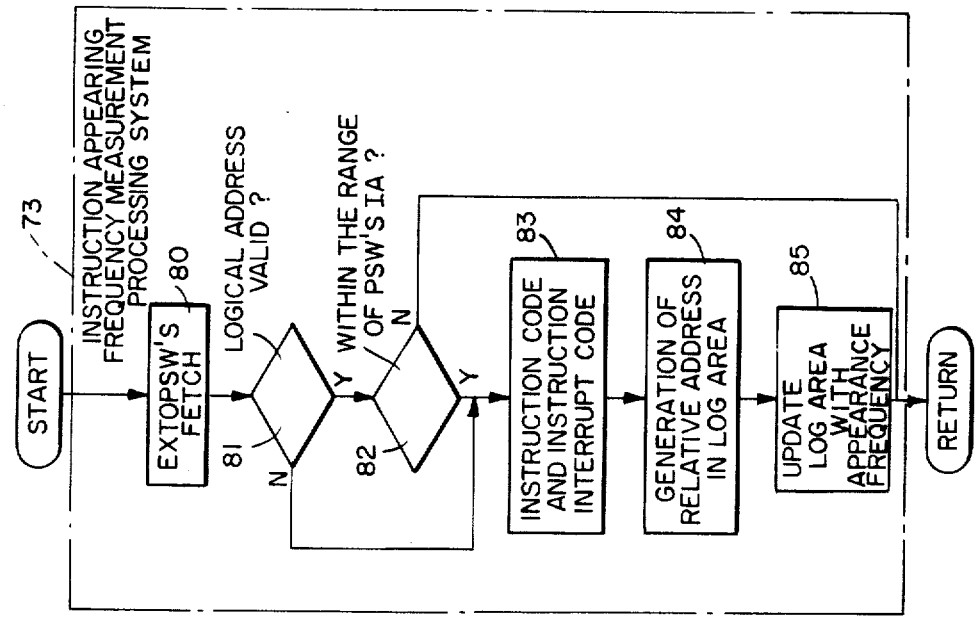

Processing by the performance measurement processing system 11 is described in reference to FIG. 10 and FIG. 11. When an external interrupt is generated, the external interrupt processing system 10 is started. The external interrupt processing system 10 determines whether the external interrupt code is X'100', namely whether it is an interrupt by the dispatch timer 12, in decision processing block 70 shown in FIG. 10. If not, existing ordinary interrupt processing is carried out. If an interrupt by timer 12 is generated, control is transferred to the performance measurement processing system 11.

The performance measurement processing system 11 turns ON an internal flag in processing block 71. This internal flag is a control flag for suppressing other interrupt when measurement processing. Then, an addrress from log area 13 is fetched in processing block 72 and the measurement item, that is, for example, the instruction at the time of interrupt, is decoded based on the measurement control table 14. Thereafter, according to the result of decoding, various measurement processing systems such as the instruction appearance frequency measurement processing system 73, the PSW instruction code trace processing system 74, the executable instruction logic address distribution measurement processing system 75 in the problem program mode, and the executable instruction logic address distribution processing system 76 etc. are called. During these processings, measurement information about the processing system 1 at the timing of the interrupt is collected in the specified area of the log area. For the next sampling interval, a value of 3.3 ms or 422.4 ms is set into the dispatch timer 12 in processing block 77. Then after the internal flag is turned OFF in processing block 78, the processing returns to the interrupt generating point.

The instruction appearance frequency processing system 73 executes processings, for example, as shown in FIG. 11. First, the old PSW of the external interrupt, the PSW 7 at the time when external interrupt is generated, is fetched in processing block 80 as shown in FIG. 11. Then, a check occurs on whether the logical address is valid by referring to the FLAG 16-1 of the measurement control table 14 in decision processing block 81. If the address is valid, a check occurs in the processing block 82, on whether an instruction address obtained from said old PSW is within the measurement information collecting range (between the heading and end logical addresses), designated by the measurement control table 14, or not. If the address is out of the range, no information is collected. If the address is within the range, the instruction code and instruction sub-code at the time when an interrupt is generated are fetched on the basis of the instruction address in the old PSW in processing block 83. As described with respect to FIG. 3, the relative address in the log area 13 is generated in processing block 84 and appearance frequency of the corresponding instruction is updated in processing block 85 where the appearance frequency is equal to the number of times the interrupt has occurred during the sample period. When above processings are repeated for each external interruption generated with the preset sampling synchronization, randomized accurate instruction appearance frequency information as a whole can be obtained. If the executing period of each instruction in the processing system 1 is different, it is necessary to adjust collected results by weighting them with the inverse value of the executing time.

The PSW instruction code trace processing system 74 performs an execution to directly trace the contents or instruction code of the PSW when an interrupt is generated and load such into the log area 13. The executable instruction logic address distribution measurement processing systems 75 and 76 execute the processing for counting the appearance frequency of executable instruction for each presegmented logical address range. In the same way, these instructions can be called and executed by providing the appropriate processing system which collects the desired measurement information.

Figure 12:
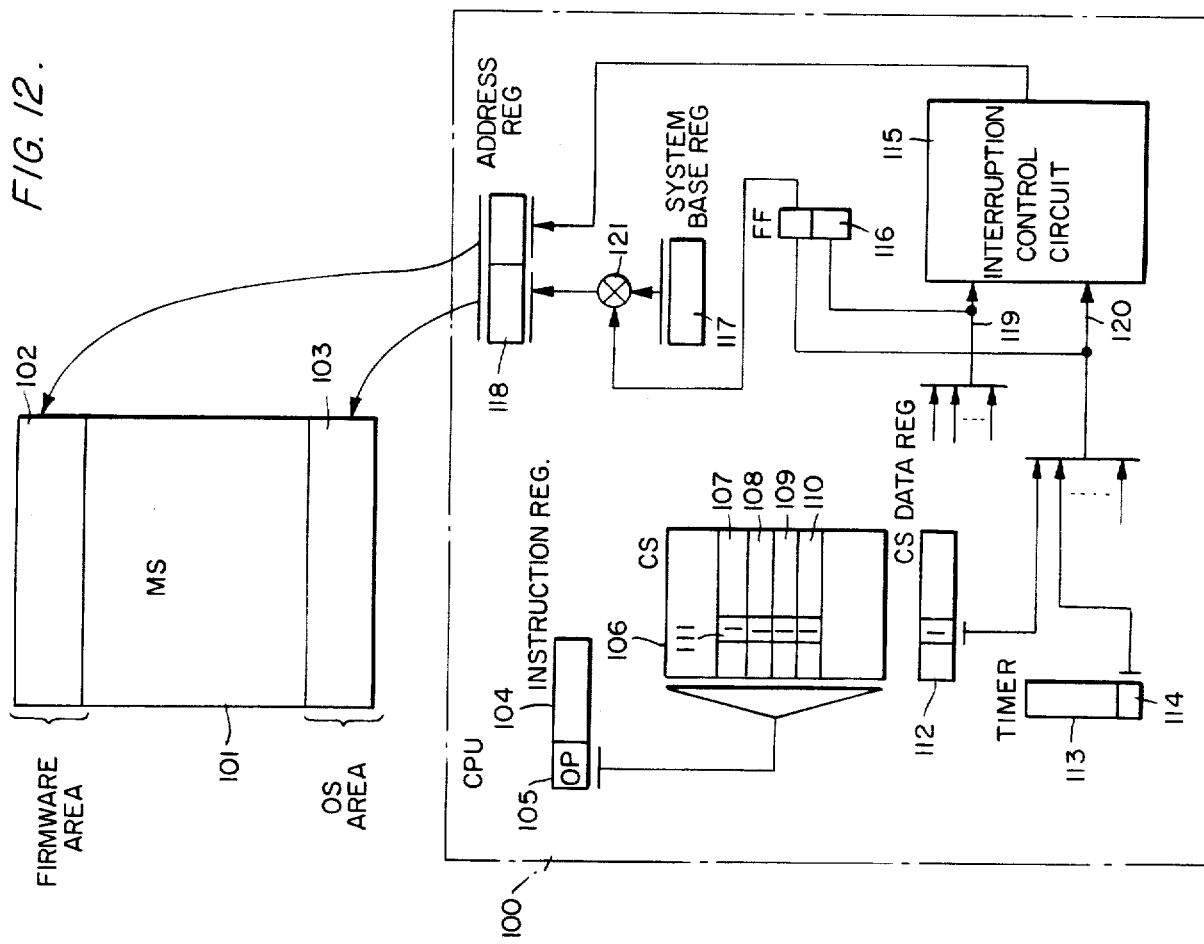
FIG. 12 is a diagram of the hardware of the data processing system of the preferred embodiment.

The hardware operation in the present embodiment is now described. In FIG. 12, 100 is a central processing unit (CPU), 101 is a main storage unit (MS), 102 designates a firmware domain, 103 designates an operating system (OS) domain, 104 is an instruction register, 105 is an OP code part, 106 is a control storage (CS), and 107–110 are micro operation words corresponding to the MODE SET instruction 6-1, the START instruction 6-2, the STOP instruction 6-3 and the MODE RESET instruction 6-4 shown in FIG. 2. 111 is a validity flag, 112 is a CS data register, 113 is a timer circuit, 114 is a timer interrupt flag, 115 is an interrupt control circuit, 116 is a system control latch, 117 is a system base register, 118 is an address register, 119 is an interrupt signal line instructing that ordinary interrupt be processed by the OS domain, 120 is an interrupt signal line instructing that an interrupt be processed by the firmware domain, and 121 is a control gate.

First, during execution of the ordinary program processing, the MODE SET instruction 6-1, START instruction 6-2, STOP instruction 6-3, MODE RESET instruction 6-4 are read and they are loaded into the instruction register 104. Then, the corresponding micro operation words 107-110 in the CS106 are read by the OP code 105 of register 104. Since the above instructions are invalid instructions, the validity flag 111 in the micro operation word is ON ("1") and this validity flag in the register 112 is held by the CS data register 112. When the invalid instructing flag becomes ON, the interrupt control circuit 115 is started through the interrupt signal line 120 and simultaneously, the system control latch 116 is set. The interrupt control circuit 115 sets the specified address of the OS area 103 into the address register 118 but when the system control latch 16 is ON, the contents of system base register 117 are loaded into the upper part of the address register 118 through the control gate 121. For this reason, when the system control latch 116 is in the set state, a start of the program is the OS area 103 is not triggered but start of the program in the firmware domain 102 is triggered. Thereby, the instruction groups within the firmware domain 102 are sequentially read and the performance measurement setting processing is carried out.

When a count value set in the timer circuit 113 is counted, the timer interrupt flag 114 becomes ON and the interrupt control circuit 115 is started through the interrupt signal line 120. At this time, an operation similar to that carried out when the invalid instructing flag is ON is also carried out and a start of the program in the firmware domain 102 is triggered. In the case of this timer interrupt, the performance measurement processing etc. is carried out by the instruction groups within the firmware domain 102.

In the case of an ordinary interrupt operation to be processed by the OS area 103, the interrupt signal line 119 becomes ON and the system control latch 116 is reset. Therefore, an incremental shift of the program start addrress is not carried out.

As described above, this invention is capable of setting desired performance measurement items without using hardware exclusively set aside for determining the performance measurement items. Particularly, various functions of an existing processing system can be used directly. Therefore, this invention can be introduced rather easily into the existing processing systems. A log area of the desired size can also be provided, ensuring excellent flexibility and expandability. Moreover, since the sampling interval can also be adjusted freely, desired measurement information can be obtained at any time desired by properly adjustng the overhead for the ordinary processing by the performance measurement system.

What is claimed is:

1. A data processing system, comprising:
   measurement information storing means for storing measurement information corresponding to performance measurement items;
   measurement control information storing means for storing performance measurement item information and performance measurement condition information;
   a timer;
   storage control means for controlling information storage in said measurement control information storing means and loading an interval in said timer; and
   performance measurement processing means which is started by an interrupt generated by said timer after the interval loaded by said storage control means has expired and for collecting measurement information and storing same in said measurement information storing means based on said performance measurement item information and performance measurement condition information.

2. A data processing system according to claim 1, further comprising performance measurement setting instructions, and said storage control means is started by an interrupt caused by said instructions.

3. A data processing system according to claim 2, wherein said performance measurement condition information comprises sampling period information to be loaded into said timer by said storage control means.

4. A data processing system according to claims 1, 2 or 3, wherein said system further comprises main storage having a firmware domain storing instruction groups, and processing by said storage control means and said performance measurement processing means is executed by the instruction groups provided in the firmware domain of said main storage.

5. A data processing system performance measurement process using instructions having an invalid operation code in the data processing system which includes an interrupt timer, comprising the steps of:
   (a) detecting an interrupt caused by one of the instructions with an invalid op code;
   (b) setting measurement parameters and enabling an analysis mode, and starting the performance measurement by loading the interrupt timer with an analysis interrupt interval;
   (c) detecting an interrupt by the interrupt timer;
   (d) collecting performance measurement data, updating a performance log and re-loading the interrupt timer with the analysis interrupt interval;
   (e) performing steps (c) and (d) a plurality of times; and
   (f) detecting an interrupt by one of the instructions with an invalid op code, stopping the performance measurement and resetting the analysis mode to disable.

6. A process according to claim 5, wherein step (a) comprises the steps of:
   (ai) determining whether the interrupt is by one of the instructions; and
   (aii) decoding the invalid operation code.

7. A process according to claim 5, wherein the instructions include a mode set instruction, a start instruction, and said step (b) comprises the steps of:
   (bi) setting the measurement parameters and enabling the analysis mode; and
   (bii) starting the performance measurement if the instruction is a start instruction.

8. A process according to claim 7, wherein the measurement process has enable and disable states, and step (bi) comprises the steps of:
   (1) setting a condition code to a first value if the process is not in the disable state;
   (2) changing the state from disable to enable if the process is in the disable state;
   (3) initializing the performance log if the process state has been changed in step (2);
   (4) loading the measurement parameters into a measurement control table if the process has been changed in step (2);
   (5) setting a sampling interval control bit if the process has been changed in step (2); and
   (6) setting the condition code to a second value if the process has been changed in step (2).

9. A process according to claim 7, wherein the measurement process includes enable, disable, start and stop states and a sampling interval control bit, and step (bii) comprises the steps of:
   (1) setting a condition code to a first value if the process is in the start state;

(2) setting the condition code to a second value if the process is in the disable state and not in the start state;

(3) changing the state from stop to start if the process is not in the start state and not in the disable state;

(4) loading the interrupt timer with a first value if the sampling interval control bit is set and if the state has been changed in step (3);

(5) loading the interrupt timer with a second value if the sampling interval control bit is not set and if the state has been changed in step (3);

(6) turning on an interrupt mask if the state has been changed in step (3); and (7) setting the condition code to a third value if the state has been changed in step (3).

10. A process according to claim 7, wherein the measurement process includes start and stop states, and step (biii) comprises the steps of:

(1) setting a condition code to a first value if the process is not in the start state;

(2) changing the state from start to stop if the process is in the start state;

(3) turning off an interrupt mask if the state has been changed in step (2); and (4) setting the condition code to a second value if the state has been changed in step (2).

11. A process according to claim 7, wherein the measurement process includes start, disable and enable states, and step (biv) comprises the steps of:

(1) setting a condition code to a first value if the process is in the start state;

(2) setting the condition code to a second value if the process is not in the start state and in the disable state;

(3) changing the state from enable to disable if the process is not in the start state and not in the disable state; and (4) setting the condition code to a third value if the state has been changed in step (3).

12. A process according to claim 5, wherein step (d) comprises the steps of:

(di) turning on an internal flag;

(dii) fetching a log area address and decoding a performance measurement identifier;

(diii) collecting performance measurement data corresponding to the identifier and updating the performance log;

(div) loading the interrupt timer with the interrupt interval; and (dv) turning off the internal flag.

13. A process according to claim 5, wherein the instructions include a stop instruction and a mode reset instruction, and said step (f) comprises the steps of:

(fi) stopping the performance measurement if the instruction is the stop instruction; and (fii) setting the analysis to disable if the instruction is the mode instruction.

14. A data processing system performance measuring system using instructions having invalid operation codes, comprising:

storage means for storing an operating system program in an operating system storage area and a measurement system program in a measurement system program storage area; and a central processing unit connected to said storage means and comprising:

an instruction register;

a control storage connected to said instruction register and storing micro-operation words each having an invalidity indicator and corresponding to the invalid operation codes;

a control storage data register connected to said control storage and generating a first interrupt signal when the invalidity indicator is present;

a timer for generating a second interrupt signal;

an interrupt control circuit, connected to said control data storage register and said timer, for outputting the address of the operating system storage area;

an address register, connected to said interrupt control circuit and said storage means, for receiving the output from said interrupt control circuit and addrressing said storage means; and address modifying means, connected to said control storage data register and said timer, for modifying the address in said address register to address the measurement system program area in dependence upon the first and second interrupt signals.

15. A system according to claim 14, wherein said data processing system generates a third interrupt signal and said address modifying means comprises:

a system control latch connected to said control storage data register and said timer and receiving the third interrupt signal;

a system base register; and a control gate connected to said system control latch, said system base register and said address register.

* * * * *

UNITED STATES PATENT AND TRADEMARK OFFICE
CERTIFICATE OF CORRECTION

PATENT NO. : 4,601,008
DATED : July 15, 1986  Page 1 of 2
INVENTOR(S) : MOTOKAZU KATO It is certified that error appears in the above-identified patent and that said Letters Patent is hereby corrected as shown below:

IN THE DRAWINGS:

"Fig. 3" should be --FIG. 3A--.

Col. 1, line 67, delete "by".

Col. 2, line 9, "3" should be --3,--;

line 42, "instructins" should be --instructions--;

line 53, delete "an" (second occurrence).

Col. 3, line 27, after "after" insert --a period--;

delete "a";

line 28, delete "period".

Col. 5, line 34, "X'100'," should be --X'1001',--.

UNITED STATES PATENT AND TRADEMARK OFFICE
CERTIFICATE OF CORRECTION

PATENT NO. : 4,601,008

DATED : July 15, 1986

INVENTOR(S) : MOTOKAZU KATO

It is certified that error appears in the above-identified patent and that said Letters Patent is hereby corrected as shown below:

Col. 6, line 67, delete "in the register 112";

line 68, after "flag" insert --in the register 112--.

Col. 7, line 10, "is" (first occurrence) should be --in--.

Signed and Sealed this

Eighteenth Day of November, 1986

Attest:

DONALD J. QUIGG

Attesting Officer     Commissioner of Patents and Trademarks